United States Patent [19]

Yumura et al.

[11] Patent Number: 5,130,873
[45] Date of Patent: Jul. 14, 1992

[54] HEAD POSITIONING APPARATUS FOR DISC UNIT

[75] Inventors: Takashi Yumura; Tetsu Yamamoto; Manabu Ogura, all of Amagasaki, Japan

[73] Assignee: Mitsubishi Denki Kabushiki Kaisha, Japan

[21] Appl. No.: 661,387

[22] Filed: Feb. 26, 1991

Related U.S. Application Data

[63] Continuation of Ser. No. 355,924, May 23, 1989.

[51] Int. Cl.⁵ .................. G11B 5/55; G11B 5/596
[52] U.S. Cl. .................... 360/106; 360/78.04
[58] Field of Search .............. 360/106, 104–105, 360/78.04, 109

[56] References Cited

U.S. PATENT DOCUMENTS

| | | | |
|---|---|---|---|
| 4,743,987 | 5/1988 | Farmer et al. | 360/106 |
| 4,823,336 | 4/1989 | Inada et al. | 369/215 |
| 4,864,447 | 9/1989 | Takekado et al. | 360/106 |

FOREIGN PATENT DOCUMENTS 57-110069 7/1982 Japan .
58-211363 12/1983 Japan .

Primary Examiner—John H. Wolff
Attorney, Agent, or Firm—Wolf, Greenfield & Sacks

[57] ABSTRACT

A head positioning apparatus for a disc unit which moves a carriage having a movable portion by driving motors constituted by coils and magnets, wherein driving power distribution of the driving motors is variable, so that the acting points of the driving forces of the driving motors can be variably set at any position to position the acting points of driving forces of the driving motors on a centroidal axis of the movable portion.

13 Claims, 6 Drawing Sheets

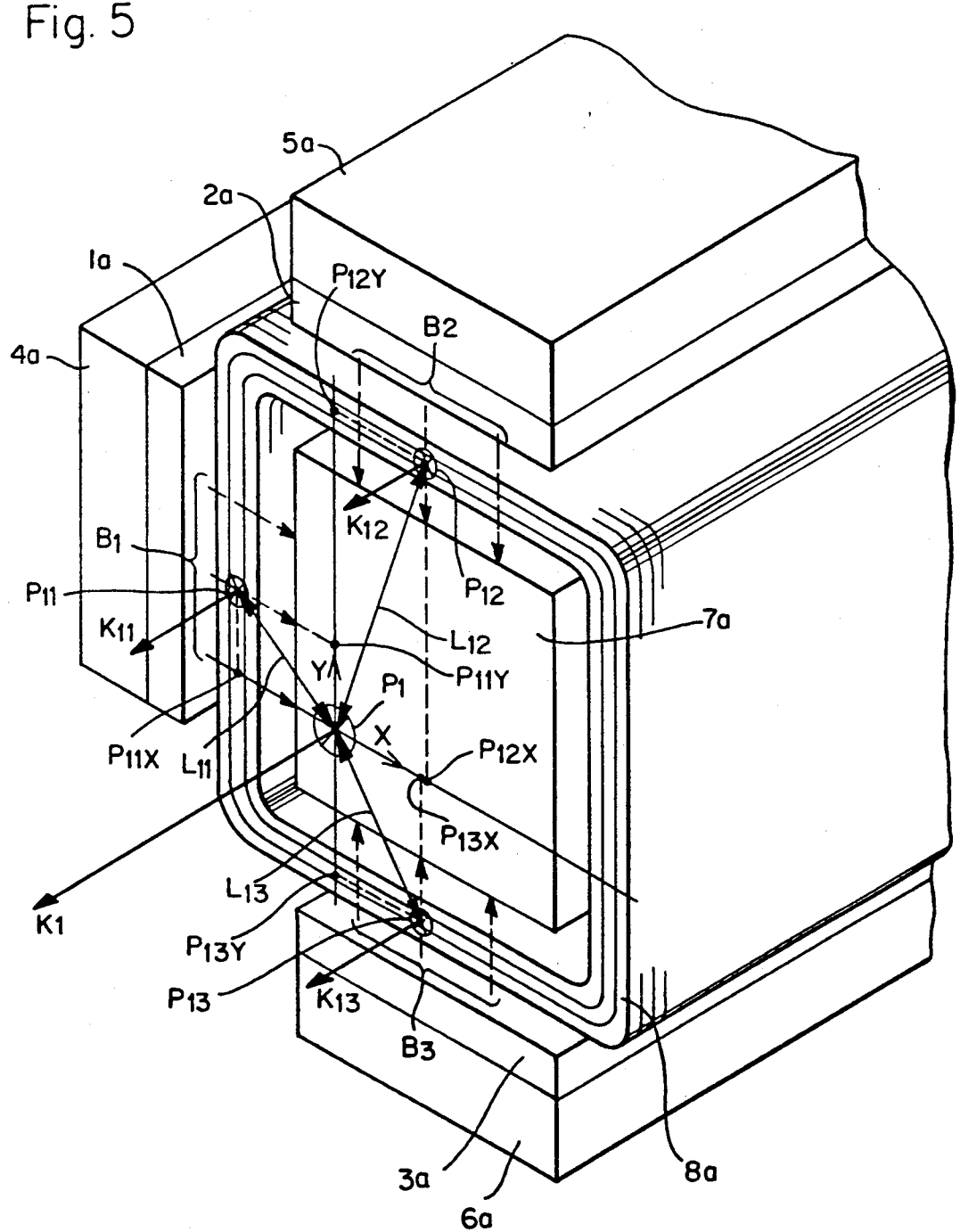

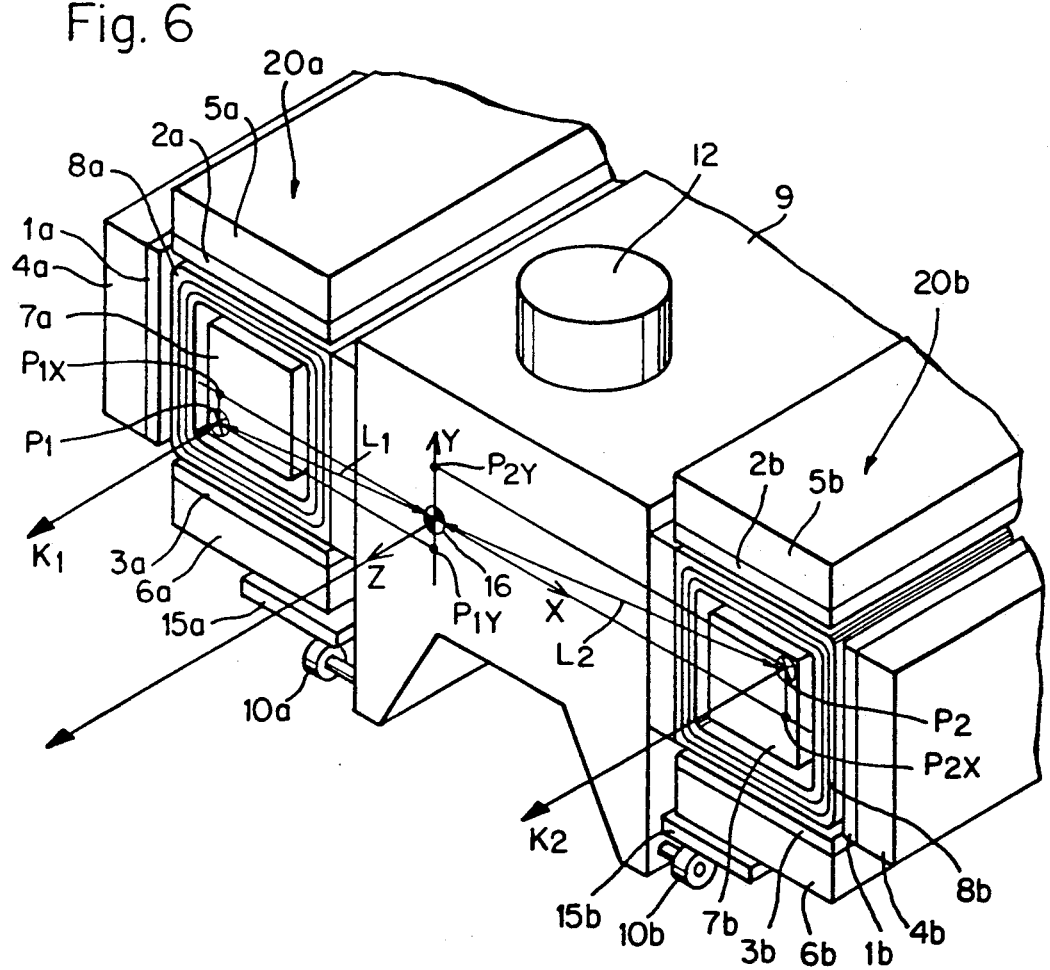

HEAD POSITIONING APPARATUS FOR DISC UNIT

RELATED APPLICATIONS

This is a continuation application of copending U.S. patent application Ser. No. 07/355,924 filed May 23, 1989.

BACKGROUND OF THE INVENTION

The present invention relates to a head positioning apparatus for an optical disc unit, a magnetic disc unit or a CD player and so on.

DESCRIPTION OF PRIOR ART

FIGS. 1 and 2 are schematic views showing a conventional example of a head positioning apparatus for a disc unit disclosed in Japanese Patent Application Laid Open No. 58-211363 (1983), in which FIG. 1 shows a side view and FIG. 2 shows a front view thereof respectively.

In the figures, a numeral $1a$ is a left permanent magnet, $1b$ is a right permanent magnet, $2a$ and $2b$ are upper permanent magnets disposed above the right and left permanent magnets $1a$ and $1b$ respectively, and $3a$ and $3b$ are lower permanent magnets disposed beneath the right and left permanent magnets $1a$ and $1b$ respectively. These permanent magnets generate magnetic fluxes.

Numerals $4a$ and $4b$ are right and left yokes provided adjacent to the right and left permanent magnets $1a$ and $1b$ respectively, $5a$ and $5b$ are upper yokes provided adjacent to the upper permanent magnets $2a$ and $2b$ respectively, $6a$ and $6b$ are lower yokes provided adjacent to the lower permanent magnets $3a$ and $3b$ respectively, and $7a$ and $7b$ are center yokes provided at the positions surrounded by respective permanent magnets.

Numerals $8a$ and $8b$ are coils for generating driving forces.

A left driving motor $20a$ as a left driving means is constituted by the left permanent magnet $1a$, upper permanent magnet $2a$, lower permanent magnet $3a$, left yoke $4a$, upper yoke $5a$, lower yoke $6a$ and center yoke $7a$, and a right driving motor $20b$ as a right driving means is constituted by the right permanent magnet $1b$, upper permanent magnet $2b$, lower permanent magnet $3b$, right yoke $4b$, upper yoke $5b$, lower yoke $6b$ and center yoke $7b$.

A numeral 9 indicates a carriage incorporating an optical head or a magnetic head. The carriage 9 includes right and left supports $10a$ and $10b$ on opposite sides in the moving direction and a center support 11 on the lower center surface respectively.

The right and left supports $10a$ and $10b$ are constituted by wheels which respectively rotate in contact with the lower face of right and left rails $15a$ and $15b$ secured along the moving direction of the carriage 9. The center support 11 is fixed along the moving direction of the carriage 9 to support it from underneath and to guide it for movement.

A numeral 12 denotes an actuator secured to the carriage 9.

A numeral 14 is a motor which rotates a disc 13.

In FIG. 1, arrows A1 and A2 indicate moving directions of the carriage 9 respectively. That is, the arrow A1 indicates a direction to which the carriage 9 proceeds to the rotating center of the disc 13, and the arrow A2 indicates a direction to which the carriage 9 departs from the rotating center of the disc 13.

Next, driving forces of the driving motors $20a$ and $20b$ for moving the carriage 9 will be described with reference to FIG. 2 of the left driving motor $20a$ as an example.

Magnetic fluxes caused by the permanent magnets $1a$, $2a$ and $3a$ form a magnetic path so as to interlink with the coils $8a$ and $8b$, pass the center yoke $7a$, side yoke (not shown), upper yoke $5a$, lower yoke $6a$ and right yoke $4a$ and return to the permanent magnets $1a$, $2a$ and $3a$. It is also similar for the right driving motor $20b$, and the driving force is generated at the position of interlinkage of the coils and magnetic flux.

The carriage 9 is supported by the right and left supports $10a$ and $10b$ and center support 11 movably and smoothly in the moving directions of the arrows A1 and A2. Thus, the carriage 9 is moved reciprocally and linearly along the rail 15 by the driving forces generated by the coils $8a$ and $8b$, enabling the positioning of the head at a desired position relative to the disc 13.

When the disc 13 is, for example, an optical disc, after positioning the head, a light beam is projected to the disc 13 from the actuator 12 to write or read information.

As it is apparent from the foregoing, the actuator 12, right and left supports $10a$ and $10b$, coils $8a$ and $8b$ and center yokes $7a$ and $7b$ move together with the carriage 9. Hereinafter, these parts are collectively referred to as a movable portion 50.

In order to move the carriage 9 smoothly and to operate its right and left driving forces effectively, acting points of the driving forces of the driving motors $20a$ and $20b$ must be essentially positioned on the centroidal axis of the movable portion 50 in the moving direction.

Now, in designing the carriage 9, though it is designed to position the center of gravity thereof at the center, it is moved when mounting the actuator 12.

However, in the conventional configuration aforementioned, in order to bring the center of gravity of the movable portion 50 in alignment with the driving forces of the driving motor, the relative position between the movable portion 50 and driving motors must be changed or the center of gravity of the movable portion 50 itself must be changed. Therefore, when employing the former, extra spaces are required around the carriage contrary to the requirements of a small-sized disc unit, and when employing the latter, a ballast must be added to the movable portion 50 to change the center of gravity contrary to the requirements of a lightweight carriage.

SUMMARY OF THE INVENTION

The present invention has been devised in view of the aforesaid circumstances, therefore, it is a primary object thereof to provide a head positioning apparatus for a disc unit which is capable of aligning the center of gravity of a movable portion with acting points of the driving forces of driving motors, without changing the relative position between the movable portion and driving motors or the center of gravity of the movable portion.

The head positioning apparatus for the disc unit of the present invention, in a configuration in which a carriage is moved by the driving motors constituted by coils and magnets, employs the configuration in which driving force distributions of the driving motors are variable. Thus, according to the present invention, since the acting points of driving forces of the driving motors can be set at any positions, the acting points of driving forces of the driving motors can be positioned on a centroidal axis of the movable portion.

The above and further objects and features of the invention will more fully be apparent from the following detailed description with accompanying drawings.

BRIEF DESCRIPTION OF THE DRAWINGS

FIG. 5 is a perspective view of one of the driving members detailing force distributions, and FIG. 6 is a perspective view of the disc unit including force distributions as shown in FIG. 4.

DESCRIPTION OF THE PREFERRED EMBODIMENTS

The present invention will be described as follows in connection with the drawings showing its embodiment.

Figure 3:
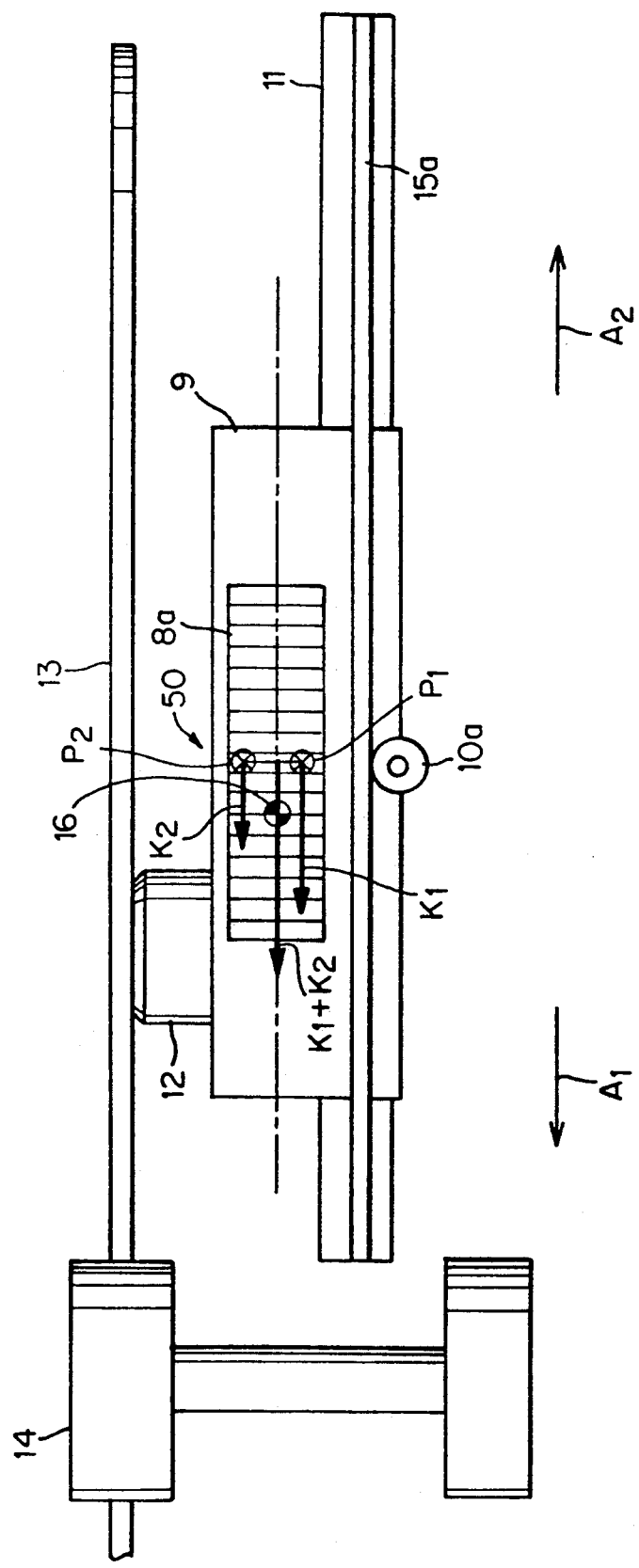
FIG. 3 is a side view of a head positioning apparatus for a disc unit of the present invention.
Figure 4:
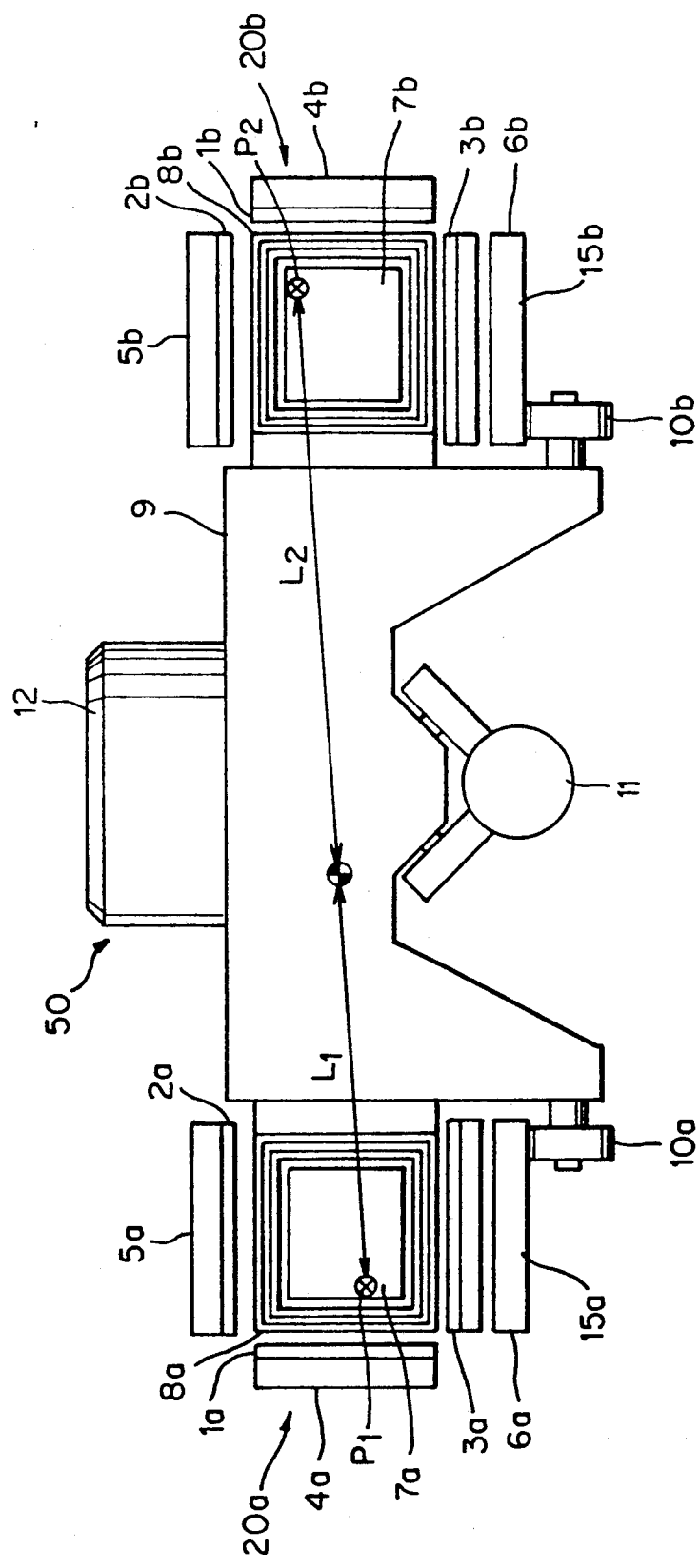
FIG. 4 is its front view.

FIG. 3 shows a side view of a disc unit including a head positioning apparatus for a disc unit of the present invention, and FIG. 4 shows its front view.

In the figures, a numeral 1a is a left permanent magnet, 1b is a right permanent magnet, 2a and 2b are upper permanent magnets disposed above the right and left permanent magnets 1a and 1b respectively, and 3a and 3b are lower permanent magnets disposed beneath the right and left permanent magnets 1a and 1b respectively. Magnetic fluxes are caused by these permanent magnets.

Numerals 4a and 4b are right and left yokes provided adjacent to the right and left permanent magnets 1a and 1b respectively, 5a and 5b are upper yokes provided adjacent to the upper permanent magnets 2a and 2b respectively, 6a and 6b are lower yokes provided adjacent to the lower permanent magnets 3a and 3b respectively, and 7a and 7b are center yokes provided at positions surrounded by respective permanent magnets.

Numerals 8a and 8b are coils for generating driving forces.

A left driving motor 20a as a left driving means is constituted by the left permanent magnet 1a, upper permanent magnet 2a, lower permanent magnet 3a, left yoke 4a, upper yoke 5a, lower yoke 6a and center yoke 7a, and a right driving motor 20b as a right driving means is constituted by a right permanent magnet 1b, upper permanent magnet 2b, lower permanent magnet 3b, right yoke 4b, upper yoke 5b, lower yoke 6b and center yoke 7b.

A numeral 9 indicates a carriage incorporating an optical head or a magnetic head. The carriage 9 includes right and left supports 10a, 10b on opposite sides in the moving direction and a center support 11 on a lower center surface.

The right and left supports 10a and 10b are constituted by wheels which respectively rotate in contact with the lower face of right and left rails 15a and 15b secured along the moving direction of the carriage 9. The center support 11 is fixed along the moving direction of the carriage 9 to support it from underneath and to guide it for movement.

A numeral 12 denotes an actuator secured to the carriage 9.

A numeral 14 is a motor which rotates a disc 13.

In FIG. 3, arrows A1 and A2 indicate the moving directions of the carriage 9 respectively. That is, the arrow A1 indicates a forward direction to which the carriage 9 proceeds to the rotating center of the disc 13, and the arrow A2 indicates a rearward direction to which the carriage 9 departs from the rotating center of the disc 13.

Next, driving forces of the driving motors 20a and 20b for moving the carriage 9 will be described with reference to FIG. 4 of the left driving motor 20a as an example.

Magnetic fluxes caused by the permanent magnets 1a, 2a and 3a form a magnetic path so as to interlink with the coils 8a and 8b, pass the center yoke 7a, side yoke (not shown), upper yoke 5a, lower yoke 6a and right yoke 4a and return to the permanent magnets 1a, 2a and 3a. It is also similar for the right driving motor 20b, the driving force is generated at the position of interlinkage of the coils and magnetic flux.

The carriage 9 is supported by the right and left supports 10a and 10b and center support 11 movably and smoothly in the moving directions A1 and A2. Thus, the carriage 9 is moved reciprocally and linearly along the rail 15 by the driving forces generated by the coils 8a and 8b, enabling the positioning of the head at a desired position relative to the disc 13.

When the disc 13 is, for example, an optical disc, after positioning the head, a light beam is projected to the disc 13 from the actuator 12 to write or read information.

As it is apparent from the foregoing, the actuator 12, right and left supports 10a and 10b, and coils 8a and 8b move together with the carriage 9. Hereinafter, these parts are collectively referred to as a movable portion 50.

A numeral 16 in FIG. 4 indicates the center of gravity of the movable portion 50. A straight line formed by the center of gravity as the carriage 9 moves is a centroidal axis.

P1 and P2 are acting points (left acting point and right acting point) of the coils 8a and 8b of the carriage 9 respectively, and K1 and K2 are respective driving forces (left driving force and right driving force) thereof (See also FIG. 3).

In such an apparatus, if the acting points of the driving motors 20a and 20b are positioned in line with the centroidal axis in the moving direction of the movable portion 50, the movable portion 50 can be moved fast without unwanted vibrations. For example, as shown in FIG. 4, assume that, in the plane perpendicular to the moving direction of the movable portion 50, the center of gravity 16 thereof is shifted from the center of the carriage 9 as shown. In this case, in order to align the center of gravity 16 of the movable portion 50 with the acting points of driving forces of the driving motors 20a and 20b, the following two conditions should be satisfied.

(1) $K1 \times L1 = K2 \times L2$ (2) positioning the acting points P1 and P2 in point symmetry against the center of gravity 16, where, L1 is a distance from the center of gravity 16 to the acting point P1 and L2 is that to the acting point P2.

Figure 1:
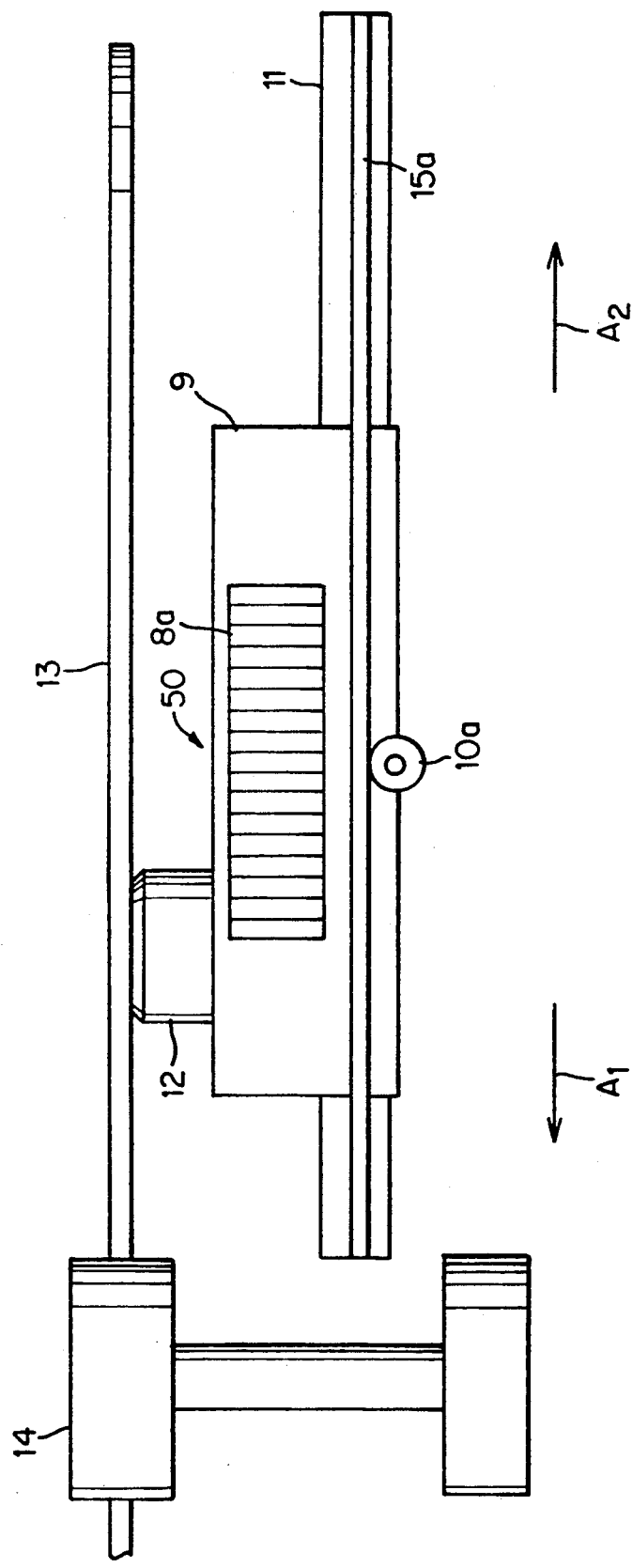
FIG. 1 is a side view of a head positioning apparatus for a conventional disc unit.
Figure 2:
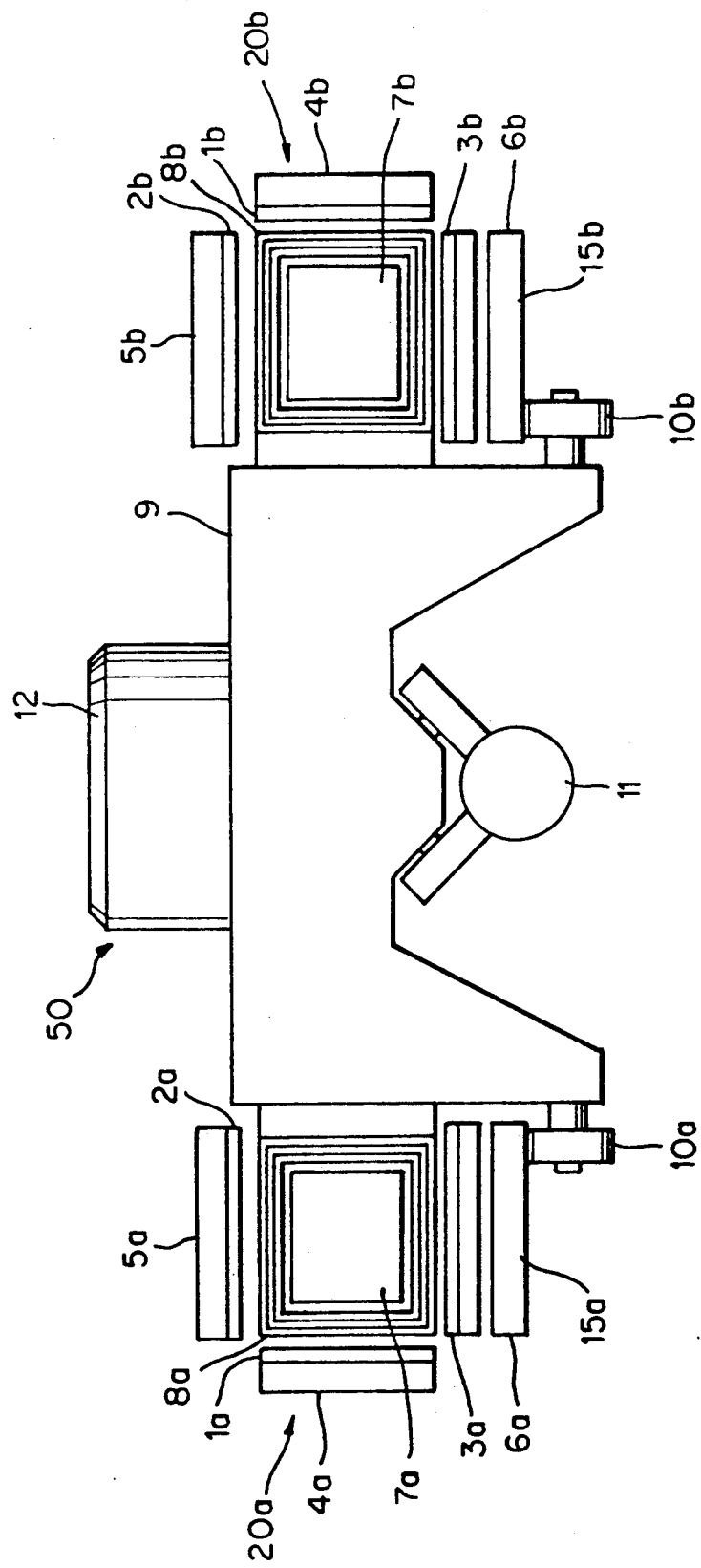
FIG. 2 is its front view.

In the conventional apparatus aforementioned, in the case shown in FIG. 2, it was necessary to move the left driving motor 20a to lower left to bring L1 in alignment with L2, or to add a ballast to move the position of the center of gravity 16 of the carriage 9 or to redesign the carriage 9.

However, in the present invention, the acting points are movable by varying driving force distributions of the right and left driving motors 20a and 20b.

FIG. 5 shows the particular force distributions in one of the driving members brought about the interaction of the coils 8a, 8b with the magnet 1a-3a. The distribution responds similarly for the opposing driving member. B1-B3 are magnetic fluxes which are generated at magnets 1a-3a and that interlink with the coil 8b to generate driving forces along the direction depicted by the force arrow K1. The particular position of the driving force (K1) point (or "acting point") P1 for this side is determined by the point locations $P_{11}-P_{13}$ of the partial components of force $K_{11}-K_{13}$ that are generated locally by fluxes B1-B3 of each magnet 1a-3a along the respective side of coil 8b facing this magnet. $P_{11}-P_{13}$ are each positioned at some location within the coil 8a that may be characterized by X and Y coordinates ($P_{11x}-P_{13x}$ and $P_{11y}-P_{13y}$). The sum of the X and Y components of these partial driving force acting points $P_{11}-P_{13}$ along the coil sides determines the overall location of the driving force point P1 and magnitude of the driving force K1. Clearly, altering the magnetic fluxes between any one of the magnets (1a-3a) and coil sides will alter the particular partial driving force magnitude and driving force acting point location for that side.

The realignment of each of the opposing acting points (P1, P2) in their respective driving members with respect to the center of gravity 16 is particularly detailed in the perspective view at FIG. 6.

It is possible to vary the driving forces (K1 and K2) of the driving motors 20a and 20b by controlling a current value applied to the driving motors or by changing the number of magnetic fluxes generated.

For example, the magnetic intensity varies when kinds and thickness of the right and left permanent magnets 1a and 1b, upper permanent magnets 2a and 2b, and lower permanent magnets 3a and 3b are varied. Thus, gap flux density in a gap portion at interlinkage of the coils 8a and 8b and the magnetic flux may be adjusted to satisfy the aforesaid conditions (1) and (2).

At this time, if the gap flux density of the driving force K1 of the left driving motor 20a is increased against the driving force K2 of the right driving motor 20b, equation $$P1 \times L1 = P2 \times L2$$

can be met when P1 > P2 even if L1 < L2.

When the intensity of upper permanent magnets 2a and 2b is increased against the lower permanent magnets 3a and 3b, the acting points of the driving motors 20a and 20b can be moved to the upper side. As such, by varying the driving force distributions of the driving motors 20a, 20b, the acting points which are the center of driving force distributions can be moved so as to align with the center of gravity 16.

Now, in designing the carriage 9, though the center of gravity 16 is designed to position in the center, the center of gravity 16 of the movable portion 50 is moved when the actuator 12 is mounted. Therefore, by adjusting the driving forces of the driving motors 20a and 20b as aforementioned, the driving force distributions are varied and the center of gravity 16 of the movable portion 50 can be brought in alignment with the acting points of the driving forces of the driving motors 20a and 20b.

Distances between the center yokes 7a and 7b and the upper permanent magnets 2a and 2b, lower permanent magnets 3a and 3b and right and left yokes 4a and 4b may also be varied to vary the location of acting points while keeping the kind of magnet used as it is.

In the aforesaid embodiment, though the driving forces of the driving motors 20a and 20b are adjusted by adjusting the gap flux density, the number of fluxes interlinking with the coils 8a and 8b can be changed even by changing the number of turns thereof. It is moreover, possible to adjust the driving forces of the driving motors 20a and 20b by varying and controlling driving currents of the coils 8a and 8b.

As such, by varying the current value and the number of magnetic fluxes of one of the driving motors 20a and 20b disposed on the opposite sides of the movable portion 50, relative driving forces on the opposite sides of the movable portion can be adjusted. Even in the case where the driving motor is mounted only at one side or in the front or rear of the movable portion 50, by changing the number of fluxes formed at each portion of the one driving motor, the same effects as the aforementioned embodiment are exhibited. It is even effective if one of the aforesaid conditions (1) or (2) is satisfied. Furthermore, the same effects can be anticipated from a magnetic circuit constructed differently from the embodiment aforementioned.

As described hereinabove, according to the present invention, in a head positioning apparatus for a disc unit in which a carriage is moved by driving motors constituted by coils and magnets, since the acting points of driving forces of the driving motors are adapted to be positioned on a centroidal axis in the moving direction of a movable portion including the carriage, by adjusting driving force distributions of the driving motors, the center of gravity of the movable portion can be brought in alignment with the acting points of driving forces of the driving motors without changing the relative position between the movable portion and the driving motors, or changing the center of gravity of the movable portion. Thus, it is possible to respond to requirements of the small sized and light weight disc units.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof, are therefore intended to be embraced by the claims.

What is claimed is:

1. A head positioning apparatus for a disc unit which carries a carriage relative to an information recording medium comprising:

driving means including at least first and second drive members each having at least a coil and magnet and respectively disposed on opposing sides of the carriages for establishing corresponding respective driving force points relative to each of said first and second drive members disposed along a locus transverse to a direction of carriage motion, and means for positioning the driving force points of said first and second drive members in line with a center of gravity of said carriage along a direction transverse to carriage motion so that the resulting driving force is continually aligned with the center of gravity as the carriage moves, the means for positioning establishing driving force distributions of respective first and second drive members by relatively adjusting the driving forces of said drive members on each of the opposing sides of the carriage in the moving direction thereof to provide straight line alignment between the respective driving force points and the center of gravity, whereby the carriage center of gravity can be freely positioned in said carriage, the first and second drive members can be asymmetrically positioned relative thereto and the positioning and strength of the driving force points can be adjustably established based upon the positioning of the center of gravity.

2. A head positioning apparatus as set forth in claim 1, wherein the means for positioning includes means for controlling currents applied to said coils so that the gap flux density between each coil and magnet is altered.

3. A head positioning apparatus as set forth in claim 1, wherein the means for positioning includes means for changing intensity of each magnet so that the gap flux density between each coil and magnet is altered.

4. A head positioning means as set forth in claim 1, wherein the means for positioning includes means for changing the number of magnetic fluxes interlinking with each coil.

5. A head positioning apparatus as set forth in claim 4, wherein the means for positioning includes means for controlling currents applied to each coil.

6. A head positioning apparatus as set forth in claim 4, wherein the mean for positioning includes means for controlling currents applied to each coil.

7. A head positioning apparatus as set forth in claim 4, wherein the mean for positioning includes means for adjusting gap flux density in a gap portion at an interlinkage of each coil and magnetic fluxes.

8. A head positioning apparatus for a disk unit which carries a carriage relative to an information recording medium comprising:

driving means including at least first and second drive members each having at least a coil and magnet and respectively disposed on opposing sides of the carriage for establishing corresponding respective driving force points relative to each of said first and second drive members disposed along a locus transverse to a direction of carriage motion, and means for positioning the driving force points of said first and second drive members in line with a center of gravity of said carriage along a direction transverse to carriage motion so that the resulting driving force is continually aligned with the center of gravity as the carriage moves, the means for positioning including means for varying driving force distributions of said driving means by relatively adjusting the driving forces of said driving means on each of the opposing sides in the moving direction of said carriage.

9. A head positioning means as set forth in claim 8, wherein the means for positioning includes means for changing the number of magnetic fluxes interlinking with each coil.

10. A head positioning apparatus as set forth in claim 9, wherein the number of magnetic fluxes interlinking with said coils can be changed by changing the number of turns of said coils.

11. A head positioning apparatus as set forth in claim 10, wherein the means for positioning includes means for controlling currents applied to each coil.

12. A head positioning apparatus as set forth in claim 9, wherein the means for positioning includes means for adjusting gap flux density in a gap portion at an interlinkage of each coil and magnetic fluxes.

13. A head positioning means as set forth in claim 8, wherein the means for positioning includes means for changing intensity of each magnet.

* * * * *